United States Patent [19]

Doyle

[11] Patent Number: 4,658,855

[45] Date of Patent: Apr. 21, 1987

[54] MASS FLOW CONTROLLER
[76] Inventor: James H. Doyle, 2003 Ivy Hill La., Orange, Calif. 92667
[21] Appl. No.: 193,876
[22] Filed: Oct. 3, 1980
(Under 37 CFR 1.47)
[51] Int. Cl.⁴ ............................................. G05D 7/06
[52] U.S. Cl. .................................. 137/468; 137/486; 137/487.5
[58] Field of Search ................... 137/486, 487.5, 468; 73/202, 204, 205

[56] References Cited

U.S. PATENT DOCUMENTS

| | | | |
|---|---|---|---|
| 3,372,590 | 3/1968 | Sterling | 73/204 |
| 3,559,480 | 2/1971 | Barber et al. | 73/197 |
| 3,650,151 | 3/1972 | Drexel | 73/194 |
| 3,650,505 | 3/1972 | Drexel | 251/11 |
| 3,792,609 | 2/1974 | Blair et al. | 73/205 |
| 3,805,610 | 4/1974 | Jacobs | 73/202 |
| 3,851,526 | 12/1974 | Drexel | 73/202 |
| 3,938,384 | 2/1976 | Blair | 73/204 |
| 3,939,858 | 2/1976 | LeMay | 137/90 |
| 4,056,975 | 11/1977 | LeMay | 73/202 |
| 4,100,801 | 7/1978 | LeMay | 73/202 |
| 4,255,968 | 3/1981 | Harpster | 73/204 |

FOREIGN PATENT DOCUMENTS 876484 9/1953 Fed. Rep. of Germany ........ 420/15

OTHER PUBLICATIONS

Photocopy of Chapter 7, "Operational Amplifiers Design and Applications", published in 1971 (20 pages).
Document entitled "AFC-550 Automatic Flow Controller", bearing a copyright notice dated 1971 (24 pages).
Brochure dated Jun. 1977 entitled "Installation and Operating Instructions, Brooks Thermal Mass Flow Controller Model 5858", identified as Document No. X-5858 (18 pages).
Document entitled "Installation and Operating Instructions, Brooks Thermal Mass Flowmeter and Thermal Mass Flow Controller", dated Jan. 1979, identified as Document X-5810 (14 pages).
Document dated Feb. 1975 entitled "Operation and Service Manual Model FC260 Mass Flow Controller", from the Tylan Corporation (24 pages).
A group exhibit consisting of a plurality of bills of materials and drawings generated by applicant prior to the invention of instant application (12 drawings consisting of 37 pages).
Document generated by applicant entitled "MFC/Meter/Calibration", dated 2-4-76 (4 pages).
Document entitled "Operation and Service Manual, Models FM-360 and FM-361 Mass Flowmeters", from the Tylan Corp. (26 pages).
Undated and untitled document apparently from the Tylan Corp., which describes a Tylan GP-481 Hyoxcl "Burnt Hydrogen" Gas Control Panel (9 pages).
Untitled, undated document having subtitle "Single Op Amp Often Insufficient" (36 pages).
Untitled, undated document numbered respectively 96S, 101S, 103S, 104S, 105S and 326S, apparently provided by Analog Devices, Inc. (6 pages).
Untitled, undated sheet bearing the statement "Industry's First $49 D.P.M." (1 page).
Undated document generated by applicant entitled "Thermco Products Corporation Mass Flow Controller Model TFC772" (14 pages).
Undated document entitled "Procedure Assembly-TFC772", generated by applicant (7 pages).

Primary Examiner—Alan Cohan
Attorney, Agent, or Firm—John K. Williamson; James C. Valentine

[57] ABSTRACT

A mass flow controller is disclosed herein having a bridge with a pair of arms positioned in good heat transfer relation with a gas stream, the flow rate of which is to be controlled and energized by a constant current generator wherein a resistance difference due to differential cooling by the gas stream is sensed by a bridge amplifier. A linearization network receives a signal from the bridge amplifier and applies one or more correction factors to the bridge amplifier signal to yield a linearized signal having a substantially linear relation to the rate of flow of the gas stream. A comparator receives the linearized signal and a user selectable set point signal and produces a comparator output signal which is sensed by a servoamplifier. The servoamplifier controls a valve which meters the rate of flow of the gas stream.

12 Claims, 3 Drawing Figures

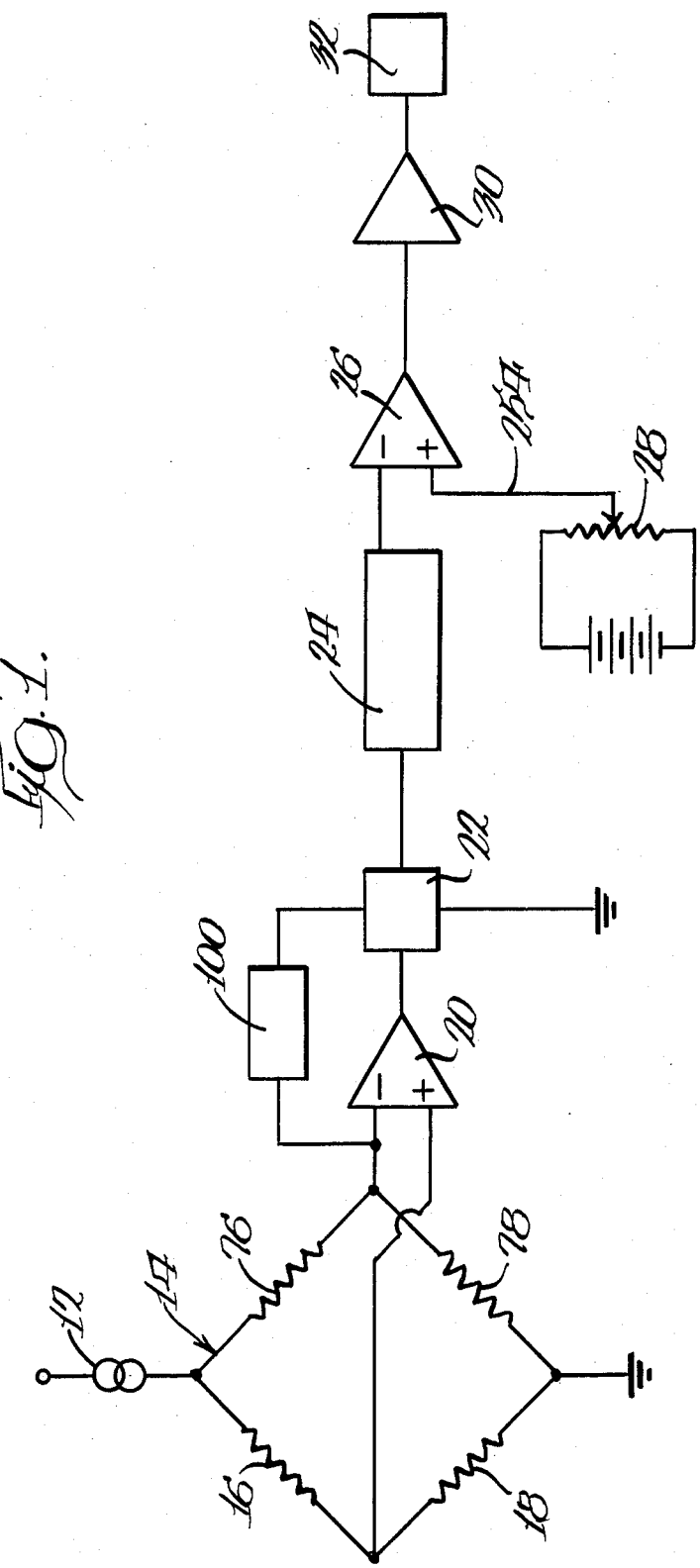

MASS FLOW CONTROLLER

BACKGROUND OF THE INVENTION

Manufactures of semiconductors normally use diffusion furnaces to dope silicon crystals or silicon polycrystalline substrates with Group III or Group V elements, such as boron and phosphorus, to manufacture semiconductors. The dopants, as well as passivating compounds, are supplied by gas streams flowing into the diffusion furnace. Typical gases include hydrogen, hydrogen chloride, nitrogen, oxygen and silane. It may be appreciated that the concentration of doping material in the silicon must be controlled very precisely to provide semiconductors having predictable and uniform electrical characteristics. Thus, it is necessary to meter precisely the amount of gas which is supplied to the diffusion furnace. Furthermore, two or more gases are sometimes reacted in the furnace. In this event, precise stoichiometric proportions must be maintained for gas flow measurement.

The prior art teaches a number of electronic systems having bridges fed from constant current generators. The bridges usually have a pair of resistors positioned within or in good heat conduction relation to the main gas stream or a branch thereof, one resistor being disposed upstream from the other. When current is supplied to the bridge, both the upstream and downstream resistors generate heat, which is transferred to the gas flowing past the resistors. The upstream resistor is cooled more than the downstream resistor, causing a shift in the voltage at the junction between the upstream and downstream resistors. This junction voltage shift is amplified and compared with a set point voltage to produce an error signal fed to a servoamplifier to control a metering valve.

U.S. Pat. No. 3,372,590 to Sterling discloses a thermal flow meter employing a constant current source having a transistor 26 biased at its base by a Zener diode connected to its base. However, it should be noted that the flow meter of Sterling supplies an output voltage having a nonlinear relationship with respect to the rate of fluid flow in conduit 90, as is clearly shown in FIG. 7.

A mass flow controller is disclosed herein having a Zener diode biased constant current generator, which supplies a constant current to a bridge having an upstream resistor leg and a downstream resistor leg positioned in good heat conduction relation with a branch conduit to thermally detect the rate of flow of a gas traveling through the conduit. A variable gain bridge amplifier having good D.C. response and minimal high frequency gain is connected to the bridge to produce an amplified sensor voltage signal indicative of the relative difference in temperatures of the upstream and downstream arms of the bridge in response to the rate of flow of the gas through the branch conduit. The bridge amplifier includes a feedback loop having a user adjustable impedance to provide a user selectable gain for the bridge amplifier.

A plurality of operational amplifiers configured as precision limiters are connected in parallel with one another and receive an output signal from the bridge amplifier. Each of the precision limiters is adjusted during assembly to provide piecewise linearization of the bridge amplifier signal.

A comparator having limited high frequency gain receives a set point voltage signal and the piecewise linearized signal and provides a comparator output signal having an amplitude related to the difference between the linearized signal and the set point signal.

The comparator output signal is supplied to a servoamplifier which drives a solenoidal control valve. A feedback loop having capacitive reactance is connected from a servoamplifier output to an input terminal of the comparator where a feedback signal is added to the linearized signal.

It is a principal object of the present invention to provide a mass flow controller having a plurality of operational amplifier precision limiters for conditioning a sensor signal to provide a linearized signal which is substantially linear with respect to the rate of flow of a gas.

Other objects of the invention will become obvious to one skilled in the art upon a perusal of the specification and claims in light of the accompanying drawings.

BRIEF DESCRIPTION OF THE DRAWINGS

FIG. 1 is a block diagram of the mass flow controller circuit;

DESCRIPTION OF THE PREFERRED EMBODIMENT

Figure 2A:
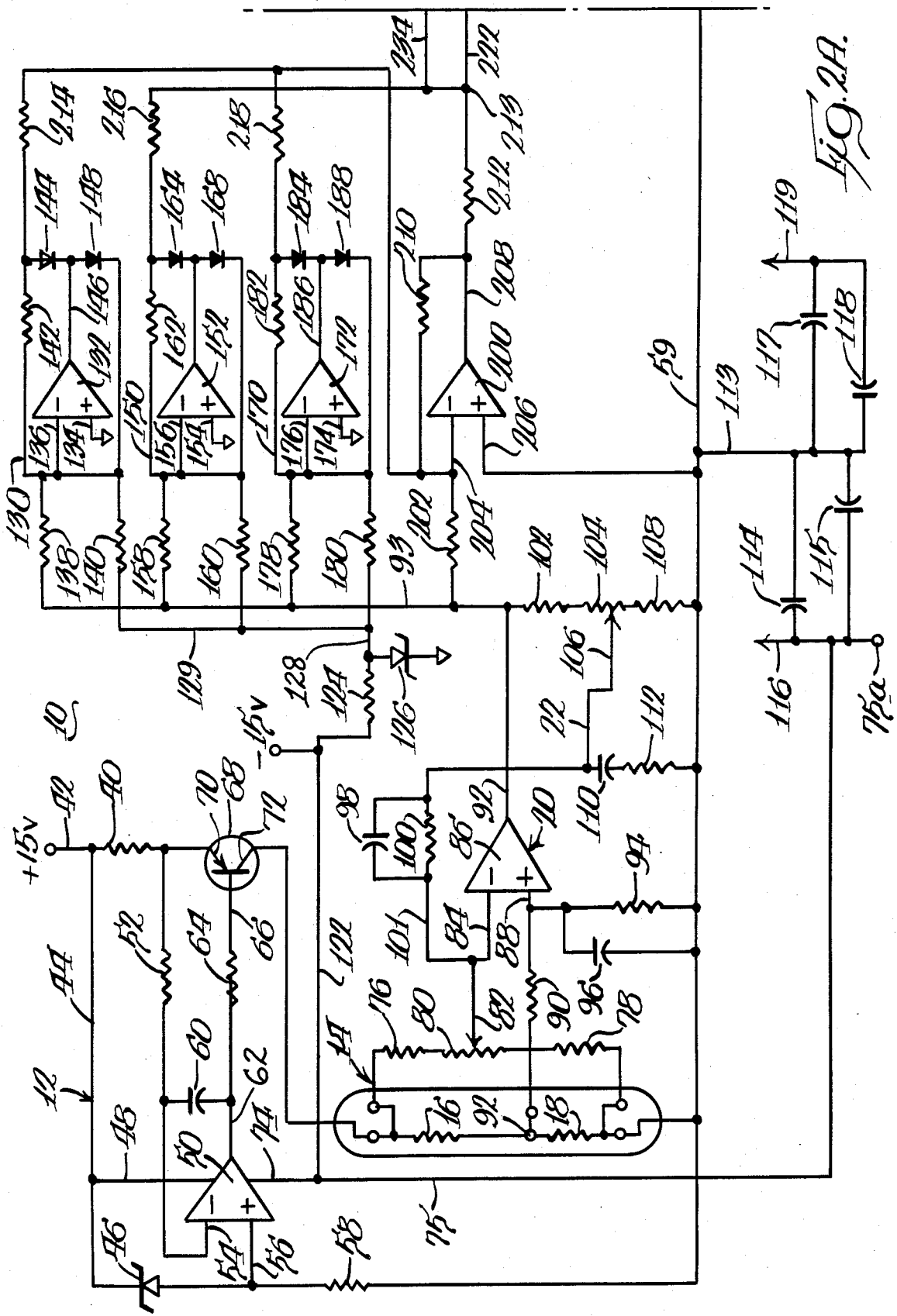
FIG. 2a is a schematic diagram of a portion of a mass flow controller circuit.
Figure 2B:
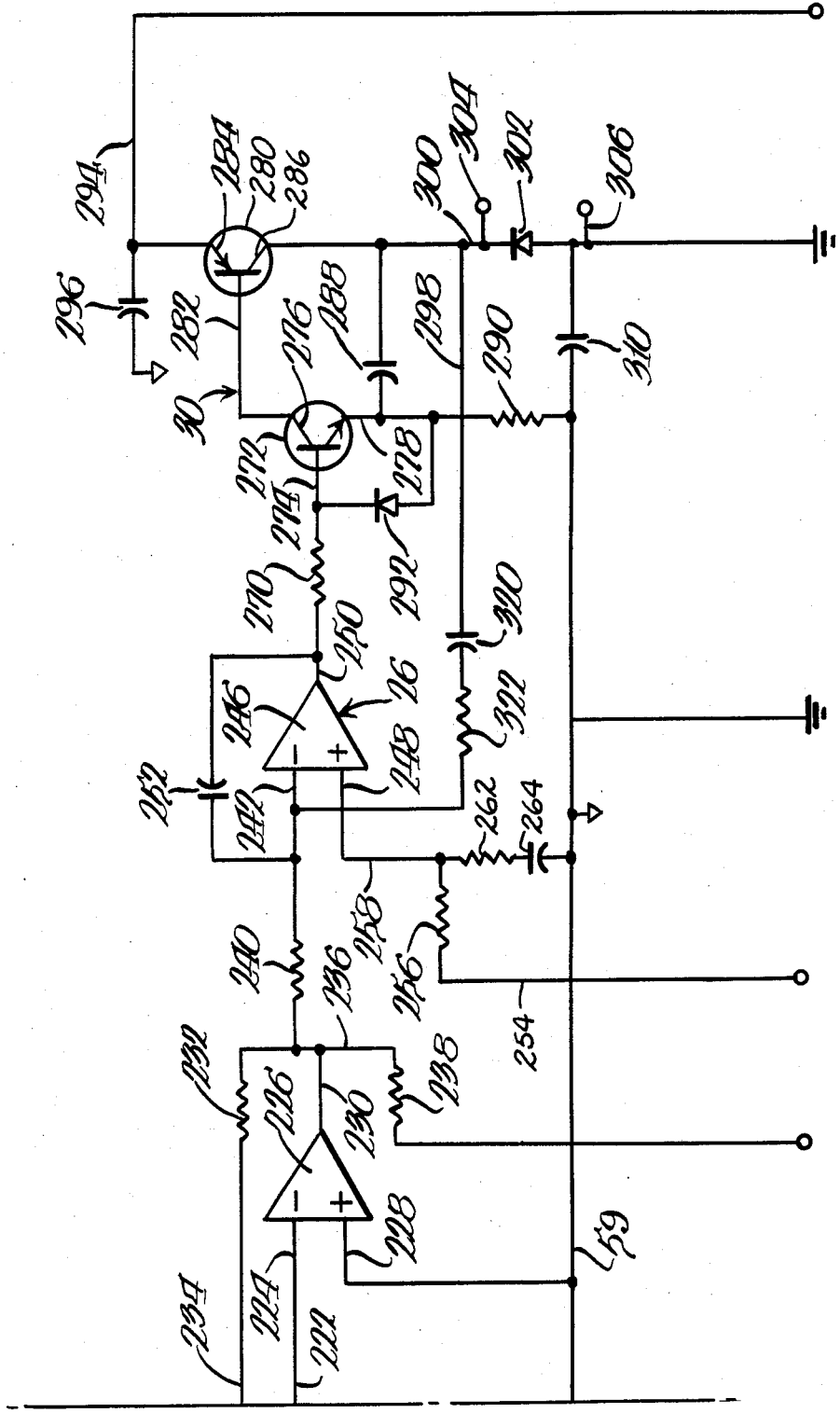
FIG. 2b is a schematic diagram of another portion of the mass flow controller circuit.

Referring now to the drawings and in particular to FIG. 1, a mass flow controller 10 embodying the instant invention is shown therein. The mass flow controller 10 has a constant current generator 12 connected to a bridge 14 for supply of current thereto. The bridge 14 has a pair of resistors, respectively identified by numerals 16 and 18, which are positioned within a branch tube of a gas flow line. The resistor 16 and the resistor 18, in this embodiment, each being comprised of about 50 turns of one ohm per turn resistance wire, are coiled around the branch tube in good heat conducting relation therewith, with the resistor 16 disposed upstream of the resistor 18. A bridge amplifier 20 having variable gain, preselectable by a user, by varying an impedance in a grounded portion of a feedback loop 22, is connected to the bridge 14 and produces an output signal porportional to the differential change in resistance of the resistors 16 and 18 caused by gas flowing past the resistors 16 and 18. The bridge amplifier output signal is supplied to a linearizing network 24 comprised of a plurality of precision limiter circuits. Linearizing network 24 supplies a substantially linear potential, which is directly proportional to the rate of flow of gas, to a comparator 26. A user selectable set point potential, which is selected by movement of a wiper potentiometer 28, is also supplied to the comparator 26. A servoamplifier 30 receives an output signal from the comparator 26 and supplies a driver current to a well-known solenoidal valve 32, which meters the flow of gas through the gas flow line.

Referring now to FIG. 2a, in order to provide a stable voltage signal from bridge 14 to insure that the voltage signal is representative of the rate of flow of the gas, the constant current generator 12 comprises a resistor 40, which is connected at a node 42 to a source of regulated positive 15 volt potential. A lead 44 supplies the positive 15 volt potential to a reverse biased Zener diode 46 and to a supply rail 48 of an operational amplifier 50. A resistor 52 is connected to the resistor 40. The resistor 52 feeds an inverting terminal 54 of amplifier 50. A noninverting terminal 56 of the operational amplifier 50 is connected to the cathode of Zener diode 46 and resistor 58, which is connected to a ground lead 59. A regulated positive potential held at 6 volts below the 15 volt supply potential by the Zener diode 46 is supplied to the noninverting terminal 56 of the operational amplifier 50. A capacitor 60 is connected in a feedback loop between an output terminal 62 of the operational amplifier 50 and the inverting input terminal 54 to limit the high frequency gain of the operational amplifier 50 and thereby prevent oscillation of the output signal from the operational amplifier 50. The resistor 52 limits the current flow to the inverting terminal 54. A resistor 64 is connected to the output terminal 62 and the electrolytic capacitor 60 to limit current flow into a base 66 of a PNP transistor 68. The transistor 68 has an emitter 70 connected to the junction of the resistors 40 and 52. A collector 72 is connected to the bridge 14. The operational amplifier 50 also has a power supply rail 74 connected through a lead 75 to a negative 15 volt feed point 75a.

The bridge 14 includes the resistors 16 and 18 which comprise two of its legs. A fixed resistor 76 is connected to resistor 16 and collector 72 of transistor 68. A fixed resistor 78 is connected to the ground lead 59 and to the resistor 18. A potentiometer 80 is connected between the resistors 76 and 78. Potentiometer 80 is used to zero the bridge amplifier 20 during a calibration phase of the construction. A wiper 82 from potentiometer 80 is connected to an inverting terminal 84 of the bridge amplifier 20. The bridge amplifier 20 includes an operational amplifier 86 having a noninverting terminal 88, which is connected through a fixed resistor 90 to a node 92 intermediate the resistors 16 and 18.

As gas flows through the branch tube, heat generated by the resistors 16 and 18 is transferred to the gas. Since the gas is cooler at the upstream resistor 16 than it is at the downstream resistor 18, the upstream resistor 16 is preferentially cooled and hence has a lower resistance causing the voltage at the junction of the resistors 16 and 18 to rise with respect to the voltage at the junction of the resistors 76 and 78. The more rapid the gas flow, the greater the temperature difference between the resistors 16 and 18. At very high gas flow velocities, however, the differential cooling effect is no longer detectible and a different gas flow metering system than the one disclosed herein would have to be employed.

The relative variation in resistances of the resistors 16 and 18 unbalances the bridge 14 and supplies a differential input voltage to the input terminals 84 and 88 of the operational amplifier 86. The differential voltage, however, does not have a linear relationship to the rate of flow of the gas through the branch tube. Since it is necessary to provide very precise adjustment for the rates of flow of the gas, amplifier 86 boosts the differential voltage produced by bridge 14. This amplifier voltage is outputted at an output terminal 92.

Amplifier 86 is configured as a differential amplifier having a resistor 94 connected between the ground lead 59 and the noninverting terminal 88. An electrolytic capacitor 96 is connected in parallel with resistor 94. Electrolytic capacitor 96 and resistor 94 provide a low impedance ground pathway for high frequency noise that would otherwise be amplified by operational amplifier 86.

It may be appreciated that the diffusion furnace environment in which the instant invention operates is electrically noisy. It is important to eliminate this noise, wherever possible. An electrolytic capacitor 98, having the same capacitance as electrolytic capacitor 96, and a resistor 100, having the same resistance as resistor 94, are connected in parallel with each other and are connected in a feedback loop 101 between the inverting terminal 84 and the output terminal 92 of the operational amplifier 86. The electrolytic capacitor 98 and the resistor 100 also limit the high frequency response or the bandwidth of the operational amplifier 86 to prevent spurious noise signals from being amplified. Also included within the feedback loop are a fixed resistor 102 and a portion of a potentiometer 104. Since the amount of resistance of potentiometer 104 within the feedback loop 101 is controlled by the user selection of a position of a tap 106, the user may select the relative amount of gain desired from the bridge amplifier 20. The potentiometer 104 is connected to a fixed resistor 108, which is also connected to the ground 59.

The response of the electric circuit is much more rapid than the thermal response of bridge 14. The relatively slow response of the bridge 14 is caused by temperature lag within the sensor resistors 16 and 18. Thus, when the flow rate of the gas changes, the differential voltage across terminals 84 and 88 does not immediately change. In order to compensate for the temperature lag, an electrolytic capacitor 110 is connected to the capacitor 98 and the resistor 100. A resistor 112 is connected to the electrolytic capacitor 110 and to the ground lead 59. The combination of the electrolytic capacitor 110 and the resistor 112 provides a time shift to the signal supplied by the operational amplifier 86 and compensates for the temperature lag of the bridge 14.

A ground or common lead 113 is connected to lead 59. A pair of filter capacitors 114 and 115 are connected between common lead 113 and a negative 15 volt power supply lead 116, which is connected to lead 75 and terminates at node 75a. A second pair of filter capacitors 117 and 118 are connected between common lead 113 and a postive 15 volt supply lead 119, which is connected at a node 120 to a suitable source of regulated positive 15 volt D.C. potential. Lead 119 is also connected to lead 42. Capacitors 114 and 117 are electrolytic capacitors. A lead 122 is connected to lead 75 to supply a resistor 124 with a negative 15 volt potential. A Zener diode 126 is connected between the resistor 124 and the ground lead 59 to provide a regulated negative 6 volt D.C. potential to a supply lead 128. A supply lead 128, feeds a supply lead 129, which feeds linearization network 24. Linearization network 24 includes four precision limiter circuits.

A first precision limiter circuit 130, also referred to herein as the 25% precision limiter, having an operational amplifier 132 with a noninverting terminal 134 connected to ground and an inverting terminal 136 is connected to receive a current from a resistor 138 connected to the lead 93 and a resistor 140. The resistor 140 is supplied with the negative 6 volt potential from the lead 129. The resistor 138 is supplied with the output signal from the bridge amplifier 20. A feedback resistor 142 is connected to the junction of the inverting terminal 136 and resistor 138. A diode 144 is connected to resistor 142 and to a junction of an output terminal 146 of the operational amplifier 132 and a diode 148. The diode 148 is connected to a junction of the inverting terminal 136 and resistor 140. In the present embodiment, resistors 138 and 142 are each 100 kilohm resistors while resistor 140 is a 499 kilohm resistor. Amplifier 132 inverts the bridge amplifier signal when the bridge amplifier signal exceeds 1.25 volts. Below 1.25 volts, point diode 144 is back-biased and diode 148 is forward-biased, holding both ends of resistor 142 at ground and effectively removing amplifier 132 from the circuit so that no output signal is provided. The gain curve breakpoint for amplifier 132 is at 1.25 volts in this embodiment.

The output signal from bridge amplifier 20 is selected to vary between 0 and plus 5 volts over the total range of gas flow rates of interest. Thus, the breakpoint of amplifier 132 occurs at about the 25% flow rate amplitude.

A second precision limiter 150, also referred to herein as the 50% precision limiter, has an operational amplifier 152 having a noninverting input terminal 154 connected to the ground lead 59 and an inverting input terminal 156 connected to a junction of a resistor 158 and a resistor 160. A resistor 162 is connected in a feedback loop of amplifier 152 between the junction of input terminal 156 and the resistor 158 and a diode 164. The diode 164 is connected to an output terminal 166 of the operational amplifier 152. A diode 168 is connected to the junction of the diode 164 and the output terminal 166. The diode 168 is connected to the junction of the resistor 160 and the inverting input terminal 156. The resistor 158 receives the bridge amplifier signal from the lead 93. The resistor 160 receives the regulated negative 6 volt potential from the lead 129.

In the present embodiment, the resistors 158 and 162 are each 100 kilohm resistors, while the resistor 169 is a 249 kilohm resistor. The operational amplifier 152 inverts the bridge amplifier signal as long as the bridge amplifier output voltage is greater than positive 2.50 volts. When the bridge amplifier signal is less than positive 2.50 volts, the diode 164 is back-biased into a blocking state while diode 168 is forward-biased, thereby eliminating the output signal from operational amplifier 152 and effectively removing it from the circuit. Thus, the gain curve breakpoint for precision limiter 150 is at positive 2.50 volts, which in this embodiment corresponds to an ideal gas flow rate of 50%.

A third precision limiter 170, also referred to herein as the 75% precision limiter, having an operational amplifier 172 with a noninverting input terminal 174 connected to ground and an inverting input terminal 176 connected to a junction of a resistor 178 and a resistor 180. A feedback resistor 182 is connected to the junction of resistor 178 and inverting terminal 176. A diode 184 is connected to the reesistor 182. An output terminal 186 of the operational amplifier 172 is connected to the diode 184. A diode 188 is connected to the junction of the diode 184 and the output terminal 186. The diode 188 is connected to the junction of the resistor 180 and the inverting input terminal 176. The resistor 178 receives the bridge amplifier signal from the Lead 93 while the resistor 180 receives the regulated negative 6 volt potential from the lead 129. As long as the bridge amplifier potential remains above positive 3.75 volts, the operational amplifier 172 inverts the bridge amplifier signal. When the bridge amplifier potential is less than positive 3.75 volts, the diode 184 is back-biased, the diode 188 is forward-biased and operational amplifier 172 provides no output signal, effectively eliminating it from the circuit. In other words, the gain curve breakpoint for precision limiter 170 is at positive 3.75 volts, which corresponds to 75% of the maximum voltage. The 3.75 volt breakpoint and unity inverting gain factors are determined by the resistances of 100 kilohm resistor 178, 100 kilohm resistor 182 and 165 kilohm resistor 180.

In order to provide correction factors over the entire range of flow rates of interest, in this instance from a corresponding voltage from 0 to 5 volts, an operational amplifier 200 configured as an inverting amplifier having unity gain is provided herein. A resistor 202 is connected between the lead 93 and an inverting terminal 204 of the operational amplifier 200. The operational amplifier 200 also has a noninverting terminal 206 and an output terminal 208. A feedback resistor 210 is connected between inverting terminal 204 and output terminal 208. In the present embodiment, resistors 202 and 210 are identical 100 kilohm resistors. The amplifier signal is fed from output terminal 208 through a resistor 212 to a summing point 213.

Thus, it may be appreciated that amplifiers 132, 152, 172 and 200 all provide unity gain inverting functions. The only difference between each of the amplifiers is that the gain curve inflects at positive 1.25 volts for amplifier 132, at positive 2.50 volts for amplifier 152, and at positive 3.75 volts for amplifier 172. The full scale 0.00–5.00 volt range is covered by amplifier 200.

In order to provide piecewise linear compensation, resistance values are selected for an output resistor connected to the output terminal of each of the respective precision limiter circuits. In the instant embodiment, an output resistor from each of the precision limiter circuits is used to feed either the input or output sides of the full scale inverting operational amplifier 200 depending upon the polarity of the correcting voltage. Although in the present embodiment the 25%, 50% and 75% flow rate points were chosen for calibration, it may be appreciated that additional precision limiters can be added in parallel to provide as many adjustment or calibration points along the flow rate curve as is desirable.

It may further be appreciated that the correction factors from resistors 214 and 218 in this embodiment are added together at the summing point 213, which is connected through a lead 222 to an inverting input terminal 224 of an operational amplifier 226. The operational amplifier 226 also has a noninverting input terminal 228 connected to the ground lead 59 and an output terminal 230, which is connected to a feedback resistor 232. Feedback resistor 232 is connected through a lead 234 to the inverting terminal 224 of operational amplifier 230. It may be appreciated that the selection of the resistance values of resistors 214 and 218, in conjunction with the value of feedback resistor 232, determines the gain for the respective voltages fed through those resistors to summing point 213. Although in this embodiment resistors 214 and 218 are shown connected to the input of amplifier 200, while resistor 216 is connected to the input of amplifier 226, it may be appreciated that the calibration measurments may in other cases require different connection combinations to yield piecewise signal linearity. The signal fed from amplifier 200 through resistor 213 is inverted by the operational amplifier 226 and added to the signal from resistor 216.

An output sensing terminal 236 is connected to output terminal 230, a 100 ohm resistor 238 is connected to output lead 236 for externally monitoring the output voltage from the linearization network 24. The linearized voltage signal is fed through a resistor 240 to an inverting input terminal 242 of a comparator consisting of an operational amplifier 246. The operational amplifier 246 also has a noninverting terminal 248 and an output terminal 250. A capacitor 252 is connected between input terminal 242 and output terminal 250. An exterior voltage setpoint signal is fed through a lead 254 through a resistor 256 and onto a lead 258, which is connected to input terminal 248. A filtering network comprising a resistor 262 and a capacitor 264 series connected between resistor 256 and the ground lead 59 limits the high frequency response of the operational amplifier 246 by conducting high frequency noise signals preferentially to ground and only allowing the DC setpoint signal to be supplied to the noninverting input terminal 248 of operational amplifier 246.

The signal from the comparator 26 is fed to a resistor 270 connected between the output terminal 250 and the servoamplifier 30. The signal is supplied to an NPN transistor 272 at a base 274. A collector 276 of transistor 272 and an emitter 278 are connected in a Darlington configuration with a PNP power transistor 280. A base 282 of the transistor 280 is connected to collector 276. An emitter 284 is connected to a power supply lead. A collector 286 is connected through an oscillation suppressing capacitor 288 to emitter 278 of transistor 272. A biasing resistor 290 is connected to the junction of emitter 278 and capacitor 288. A transistor protection diode 292 is connected between base 274 and emitter 278 of transistor 272 to prevent backbiasing caused damage to the base-emitter Junction of transistor 272.

Power is fed to transistor 280 through emitter 284 from a power supply line 294, which is connected to an external source of regulated positive 12 volt DC potential. A filtering capacitor 296 is connected between emitter 284 and the ground lead 59 to remove high frequency signals from the servoamplifier supply line. Collector 286 is connected to a feedback loop 298 and is also connected to a valve control lead 300. A reverse biased diode 302 is also connected to the valve control lead 300, as are a pair of terminals, respectively identified by numerals 304 and 306, which are positioned on opposite sides of diode 302.

The control valve 32 is a well-known electromagnetic solenoidal control valve used for control of gases flowing into a diffusion furnace. It may be appreciated that the amount of current passing through the emitter-collector junction of transistor 284 determines the amount of valve opening of the control valve 32 connected to terminal 304 and 306.

The signal supplied from comparator 246 is amplified by transistor 272 and controls the amount of current flowing through power transistor 280. In turn, the amount of current supplied to the flow control valve 32 determines the gas flow rate through the main. In order to minimize or prevent damage to power transistor 280, diode 302 is back-biased to allow current to flow through itself when the magnetic field surrounding the solenoid collapses when power is removed. An oscillation suppressing capacitor 310 is connected between diode 302 and resistor 290 and performs the same function as the capacitor 288.

The feedback loop 298 includes a capacitor 320 which is series connected with a resistor 322. Resistor 322 is connected to the inverting input terminal 242 of the comparator 246. Due to the fact that the comparator 246 can respond to a greater degree than desired to high frequency components fed through resistor 240, capacitor 252 is provided in the feedback loop 298 to limit the bandwidth or high frequency gain of the operational amplifier 246. Thus, it is desirable to use the feedback loop 298 to control the amount of power being fed directly to the control valve 32 so that the valve adjusts relatively slowly. This is desirable due to the thermal lag present in other parts of the system. Feedback loop 298 with its capacitor 320 treats comparator 246, transistor 272 and transistor 280 as a single amplifier having a 12 decibel per octave gain curve rolloff. Capacitor 320 is added to the feedback loop to prevent the circuit from oscillating around the rolloff breakpoint.

It may therefore be appreciated that the instant invention provides a mass flow controller circuit which is sensitive to relatively small changes in the rate of flow of gas through a tube. The linearization network provides a linear correction at a number of points along a flow rate curve to insure that the voltage fed to comparator 246 is linearly proportional to the rate of flow of gas through the tube. The comparator 246 has a rapid response to any changes in the amount of error signal for the gas rate flowing through the tube. Capacitances 252 and 320 limit the high frequency gain of amplifier 246 and the servoamplifier to cause the control valve to adjust position relatively slowly to prevent overshoot of the control valve.

While there has been shown and described a single embodiment of the present invention, it will be understood that changes and modifications may be made to the claims by those skilled in the art and it is, therefore, intended by the appended claims to cover all such changes and modifications as fall within the true spirit and scope of the present invention.

What is claimed as new and is desired to be cured by Letters Patent of the United States is:

1. A mass flow controller comprising thermal resistance sensing means producing a sensor signal indicative of a rate of flow of a gas, an amplifier receiving and amplifying said sensor signal to provide an amplified signal, a linear signal conditioner having at least one operational amplifier precision limiter having a pair of diodes connected in feedback loops whereby said precision limiter produces no output signal over a first range of amplitudes of said amplified signal and said precision limiter produces an inverted output signal over a second range of said amplitudes of said amplified signal, a comparator means comparing an amplitude of said linearized signal to a set point signal and producing a command signal in response thereto, and a servoamplifier receiving said command signal and controlling a gas flow valve which meters said gas flow in response thereto.

2. A mass flow controller as defined in claim 1 wherein said thermal sensing means comprises a bridge having a pair of resistance elements in good heat conduction relation with said gas flow stream, said bridge being fed from a constant current generator to minimize errors in said sensor signal caused by shifts in the resistance of said bridge.

3. A mass flow controller as defined in claim 2 wherein said amplifier is a differential amplifier.

4. A mass flow controller comprising a constant current generator providing a regulated heating current to a thermal bridge, said thermal bridge having a pair of resistors in good heat conduction relationship with a branch tube of a gas main to transfer heat to a gas flowing through said branch tube, a differential amplifier connected across said thermal bridge to measure a sensor voltage across said thermal bridge caused by changes in resistance of said pair of resistors due to a rate of flow of said gas, said amplifier producing an amplified siganl in response to said sensor voltage, a linear signal conditioner having a plurality of precision limiters, each of said precision limiters having a gain response whereby each said precision limiter produces an output siganl when said amplified signal is within a predetermined first respective amplitude range and whereby each precision limiter produces no output signal when said amplified signal is within a predetermined second respective amplitude range, said output signals from said precision limiters being combined with said bridge amplifier signal to produce a linearized signal having an amplitude which is substantially proportional to said rate of flow of said gas, operational amplifier comparator means comparing an amplitude of said linearized signal to a D.C. set point signal and producing a command signal in response thereto, and a servoamplifier receiving said command signal and controlling a gas flow valve which matters said gas flow in response thereto.

5. A mass flow controller comprising thermal sensing means producing a sensor signal indicative of a rate of flow of a gas through a tube, amplifying means receiving and amplifying said sensor signal to provide an amplified signal, linear signal conditioning means having at least one variable gain element, a gain of said variable gain element being determined by an amplitude of said amplified signal, said variable gain element conditioning said amplified signal to produce a linearized signal which is linearly related to said rate of flow of said gas, comparator means comparing said linearized signal to a set point signal and producing a command signal in response thereto, and a servoamplifier rceiving said command signal and controlling a gas flow valve which meters said gas flow in response thereto.

6. A mass flow controller as defined in claim 5 wherein said thermal sensing means includes a bridge having a pair of resistors, one resistor being adapted to be positioned in good heat conduction relationship with an upstream portion of said tube and a second resistor being adapted to be positioned in good heat conduction relationship with a downstream portion of said tube, differential cooling of said resistors produced by said gas flow causing a voltage shift in said bridge to produce said sensor signal.

7. A mass flow controller as defined in claim 6 wherein said bridge is supplied with an electrical current from a constant current generator to minimize errors in sensing said rate of flow of said gas.

8. A mass flow controller as defined in claim 5 wherein said variable gain element is an operational amplifier having at least one diode connected in a feedback loop.

9. A mass flow controller as defined in claim 8 wherein said operational amplifier includes a second diode connected in a second feedback loop in said operational amplifier, said operational amplifier producing a signal having a first amplitude in response to said amplified signal being in a first amplitude range and producing a signal having a second amplitude in response to said amplified signal being in a second amplitude range.

10. A mass flow controller comprising thermal sensing means producing a sensor signal indicative of a rate of flow of a gas through a tube, amplifying means receiving and amplifying said sensor signal to provide an amplified signal, piecewise linear signal conditioning means conditioning said amplified signal to produce a linearized signal which is substantially linearly related to said rate of flow of said gas, comparator means comparing said linearized signal to a set point signal and producing a command signal in response thereto, and a servoamplifier receiving said command signal and controlling a gas flow valve which meters said gas flow in response thereto.

11. A mass flow measuring apparatus comprising thermal sensing means producing a sensor signal indicative of a rate of flow of a gas through a tube, amplifying means receiving and amplifying said sensor signal to provide an amplified signal, linear signal conditioning means having at least one variable gain element, a gain of said variable gain element being determined by an amplitude of said amplified signal, said variable gain element conditioning said amplified signal to produce a linearized signal which is linearly related to said rate of flow of said gas, and putput means receiving said linearized signal and producing an output signal proportional to said linearized signal.

12. A mass flow measuring apparatus comprising thermal sensing means producing a sensing signal variable with but nonlinearly related to a rate of flow of a gas through a tube, amplifying means receiving and amplifying said sensor signal to provide an amplified signal, piecewise linear signal conditioning means conditioning said amplified signal to produce a linearized signal which is substantially linearly related to said rate of flow of said gas, and output means receiving said linearized signal and producing an output signal proportional to said linearized signal.

* * * * *

UNITED STATES PATENT AND TRADEMARK OFFICE
CERTIFICATE OF CORRECTION

PATENT NO. : 4,658,855
DATED : Apr. 21, 1987
INVENTOR(S) : James H. Doyle

It is certified that error appears in the above-identified patent and that said Letters Patent is hereby corrected as shown below:

( Title Page ), item number 73 ( Assignee ), change "ThermCo Systems, Inc."

to --Silicon Valley Group, Inc.--.

Signed and Sealed this

Twenty-ninth Day of May, 2001

Attest:

NICHOLAS P. GODICI

*Attesting Officer*   Acting Director of the United States Patent and Trademark Office